United States Patent Office 3,799,902
Patented Mar. 26, 1974

3,799,902
POLYMERIC LATICES AND SODIUM ALUMINATE
Donald R. Anderson, Oswego, Ill., assignor to Nalco Chemical Company, Chicago, Ill.
No Drawing. Filed Jan. 31, 1972, Ser. No. 222,339
Int. Cl. C08f 45/24
U.S. Cl. 260—29.6 NR                10 Claims

ABSTRACT OF THE DISCLOSURE

A coating composition comprising:
(A) From 1 to 99% by weight of sodium aluminate; and
(B) From 1 to 99% by weight of a stable liquid dispersion of:
   (1) a polymeric latex composed of a water-in-oil emulsion which contains dispersed therein a finely-divided water-soluble anionic vinyl addition polymer, said polymeric latex having uniformly distributed therethroughout;
   (2) a water-soluble cationic polymer:
with the weight ratio of (1):(2) being within the range of 1:10 to 10:1 and the total amount of this anionic polymer of (1)+(2) present within said dispersion being within the range of from 0.001% to 75% by weight.

INTRODUCTION

Many attempts have been made to prepare coating composition in the form of films which may be cast on such surfaces as glass, metals, or they may be formed on the other substrates such as a wide variety of fibers such as cloth, paper and the like. The coatings can be formed into suitable coatings for the protection of a variety of surfaces against the attack of many chemical substances.

THE INVENTION

The invention relates to a coating composition of:
(A) Sodium aluminate having a concentration from 1 to 99% by weight; and
(B) From 1 to 99% by weight of a stable liquid dispersion of a water-soluble anionic vinyl addition polymer and a water-soluble cationic polymer comprising:
   (1) a polymeric latex composed of a water-in-oil emulsion which contains dispersed therein a finely-divided water-soluble anionic vinyl addition polymer, said polymeric latex having uniformly distributed therethroughout;
   (2) a water-soluble cationic polymer:
w'th the weight ratio of (1):(2) being within the range of 1:10 to 10:1 and the total amount of the anionic polymer of (1) plus (2) present within said dispersion being within the range of from 0.001% to 75% by weight.

The preferred coating composition comprises:

(A) Sodium aluminate having a concentration from 10 to 40% by weight; and the balance,
(B) From 60 to 99% by weight of a stable liquid dispersion of a water-soluble anionic vinyl addition polymer and a water-soluble cationic polymer comprising:
   (1) a polymeric latex composed of a water-in-oil emulsion which contains dispersed therein a finely-divided water-soluble anionic vinyl addition polymer, said polymeric latex having uniformly distributed therethroughout;
   (2) a water-soluble cationic polymer:
with the weight ratio of (1):(2) being within the range of 1:10 to 10:1 and the total amount of the anionic polymer of (1) plus (2) present within said dispersion being within the range of from 0.001% to 75% by wegiht.

Water-soluble anionic vinyl addition polymers that may be used in the practice of the invention are as follows:

TABLE I

| No.: | Polymer |
|---|---|
| 1 | Polyacrylic acid-sodium salt. |
| 2 | Polymethacrylic acid-sodium salt. |
| 3 | Maleic anhydride-vinyl acetate copolymer. |
| 4 | Polyvinyl methyl ether-maleic anhydride copolymer. |
| 5 | Methacrylic acid-acrylamide copolymer. |
| 6 | Polyacrylic acid. |
| 7 | Isopropenyl acetate-maleic anhydride sodium salt copolymer. |
| 8 | Itaconic acid-vinyl acetate copolymer. |
| 9 | Methyl styrene-maleic anhydride sodium salt copolymer. |
| 10 | Styrene-maleic anhydride copolymer. |
| 11 | Methylmethacrylate-maleic anhydride sodium salt copolymer. |
| 12 | Acrylic acid-styrene copolymer. |
| 13 | Acrylamide-acrylic acid copolymer (5% by weight). |
| 14 | Acrylamide-acrylic acid copolymer (50% by weight). |
| 15 | Polystyrene sulfonic acid. |
| 16 | Acrylamide-acrylic acid copolymer (80% by weight). |

The above polymers may vary in molecular weight. They may be as low as 10,000 or as high as 12,000,000 or more. In many of the more useful applications, which will be more fully discussed hereafter, the molecular weight will be greater than 1,000,000.

The invention contemplates using as preferred water-soluble anionic vinyl addition polymers the homo- and copolymers of acrylic acid as well as the water-soluble salts thereof.

The water-soluble cationic polymers

These polymers also may be selected from a wide variety of known polymeric materials. Several of these polymers are listed below in Table II.

TABLE II

| No.: | Polymer |
|---|---|
| 1 | Ethylene dichloride-ammonia condensation polymers. |
| 2 | Tetraethylene pentamine-epichlorohydrin condensation polymers. |
| 3 | Epichlorohydrin-ammonia condensation polymers. |
| 4 | Polyethylene imine. |
| 5 | Polyethylene diamine. |
| 6 | Polydiallyl amine. |
| 7 | Polydimethylamino ethyl methacrylate. |
| 8 | The methyl chloride quaternary of No. 1. |
| 9 | The benzyl chloride quaternary of No. 7. |
| 10 | Acrylamide-diallylamine copolymer (30%). |

The above polymers are illustrative of typical water-soluble cationic polymeric materials that may be used in the practices of the invention. A preferred class of these polymers may be described as alkylene polyamines which are illustrated by polymers 1, 2, 3, 5 and 8 above.

Many of the above polymers have been described with respect to the reactants from which they are prepared. A detailed discussion of the above polymers and other cationic polymers appears in Canadian Pat. No. 731,212. The polymers may be employed as a water-in-oil latex emulsion. When the polymers are of the vinyl addition type they may be copolymers of other ethylenically unsaturated monomers. Such copolymers should contain at least 5% by weight of the cationic monomer.

The anionic vinyl addition polymeric latex

The invention contemplates utilizing the water-soluble anionic vinyl addition polymers in the form of water-in-oil emulsion which contains dispersed therein the water-soluble anionic vinyl addition polymer. Emulsions of this type are prepared by dispersing the anionic vinyl addition polymer into a water-in-oil emulsion. These polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1–5 microns. After the powders have been comminuted, they may be dispersed into the water-in-oil emulsion by means of agitation provided by such devices as stirrers, shakers and the like. To be commercially practical, the amount of polymer in the emulsion should be at least 2% by weight. The invention contemplates using emulsions containing between 5 and 75% by weight with preferred emulsions having a polymer concentration within the range of 10 to 45% by weight. In some cases the starting emulsions are converted to suspensions due to the nature and the amount of the polymer present therein.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble vinyl addition polymers directly from the vinyl monomers from which these polymers are synthesized. Such polymer-containing emulsions may be synthesized by using the water-in-oil emulsion polymerization technique set forth in U.S. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices. The polymeric latices produced by this patent are relatively unstable and frequently must be treated with additional emulsifiers to render the products stable.

The water-in-oil emulsions used to prepare the above polymers may be formulated by any number of known techniques.

The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the tradename "Isopar M." Typical specifications of this narrow-cut isoparaffinic solvent are set forth below in Table III.

TABLE III

| Specification properties | Minimum | Maximum | Test method |
|---|---|---|---|
| Gravity, API at 60/60° F | 48.0 | 51.0 | ASTM D 287 |
| Color, Saybolt | 30 | | ASTM D 156 |
| Aniline point, °F | 185 | | ASTM D 611 |
| Sulfur, p.p.m | | 10 | ASTM D 1266 [1] |
| Distillation, °F.: | | | |
| IBP | 400 | 410 | ASTM D 86 |
| Dry point | | 495 | |
| Flash point, °F. (Pensky-Martens closed cup). | 160 | | ASTM D 93 |

[1] Nephelometric mod.

The amount of oil used in relation to the water to prepare the emulsion may be varied over wide ranges. As a general rule, the amount of oil-to-water may vary between 5:1 and 1:10 with preferable emulsions being prepared in the ratio of 1:1 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil-soluble emulsifier may range from 0.1 to 30% by weight based on the weight of the oil. To produce stable emulsions the amount of emulsifier will normally be within the range of 12 to 20% by weight of the oil.

Rather than provide a listing of suitable emulsifiers, recommended as being satisfactory are the so-called low Hydrophilic-Lipophilic Balance materials which are well documented in the literature and are summarized in the Atlas Hydrophilic-Lipophilic Balance Surfactant Selector. Although these emulsifiers are useful in producing good water-in-oil emulsions, other surfactants are capable of producing stable water-in-oil emulsions. A typical low Hydrophilic-Lipophilic Balance emulsifier is sorbitan monooleate.

Preparation of stable liquid dispersions

Once latices containing the water-soluble anionic vinyl addition polymers are prepared the water-soluble cationic polymers are combined therewith by the utilization of conventional mixing techniques. Preferably the water-soluble cationic polymers are in the form of aqueous solutions which contain 5 to 40% by weight of the polymer and are added to the polymeric latex. Alternatively, they may be nearly water-free. After uniformly mixing the two components there results a stable liquid dispersion of a water-soluble anionic vinyl addition polymer and a water-soluble cationic polymer. The proportions of the two polymers may be varied to a considerable degree. For instance, the ratio of the water-soluble anionic vinyl addition polymer to water-soluble cationic polymer may vary between 1:10 to 10:1 on a weight basis. A preferred ratio is 1:5 to 5:1. The most preferred ratio is 1:2 to 2:1.

The amount of the water-soluble vinyl addition polymers plus the water soluble cationic polymers present in the finished liquid dispersion may be varied over a wide range of concentrations, e.g., dispersions containing from 0.001% to 75% by weight are useful, although for most applications the total weight of the two polymers contained in the dispersion will be within the range of 5% to 40% by weight, with a very beneficial dispersion being one which contains between 10 and 30% by weight of the two polymers.

The finished dispersions are stable at room temperature for periods of time ranging between several days to as long as six months since they may be prepared over a wide variety of concentrations. Concentrates containing large amounts of polymers may be prepared and shipped to a use point and then diluted with an organic liquid just prior to use.

Preparation of liquid dispersions

To illustrate the preparation of liquid dispersions a variety of emulsions were prepared containing different water-soluble anionic vinyl addition polymers. These emulsions are set forth below in Table IV.

TABLE IV

| Composition No. | Percent by wt. | | Polymer | Percent in emulsion | Polymer particle size range |
|---|---|---|---|---|---|
| | Water phase | Oil phase | | | |
| I | 72 | 28 (I) | 93% acrylamide 7% methacrylic acid | 35 | 0.05–7.0 microns. |
| II | 72 | 28 (T) | 70% acrylamide, 30% acrylic acid | 35 | Do. |
| III | 67 | 33 (I) | 93% acrylamide, 7% methacrylic acid | 32 | < 30 microns. |
| IV | 70 | 30 (I) | 70% acrylamide, 30% acrylic acid | 34 | 0.10–10 microns. |
| V | 71 | 29 (I) | Sodium polyacrylate | 37 | < 1 millimeter. |

NOTE.—I = Isopar M, T = toluene.

Dispersion A (mixed latices)

To emulsion in Table IV, Composition No. V, there was added 30% by weight of an aqueous dispersion containing 23% by weight of an alkylene polyamine prepared from the condensation of ethylene dichloride and ammonia. The polymer was prepared using the techniques set forth in Canadian Pat. No. 785,829.

Dispersion B (mixed latices)

To Composition No. V in Table IV there was added an aqueous dispersion which contained 25% by weight of an ammonia ethylene dichloride polymer of the type used in Dispersion A above with the exception it had been quaternized with methyl chloride.

To illustrate other novel dispersions of the invention Table V is presented below:

TABLE V

| Anionic latex, Table IV | Percent by wt. | Dispersion | Cationic polymer | Percent by wt. |
|---|---|---|---|---|
| I | 60 | C | 20% solution of a tetraethylene pentamine epichlorohydrin reaction product (Canadian Pat. 731,212). | 40 |
| V | 50 | D | Polyethylene diamine | 50 |
| IV | 70 | E | 75% acrylamide, 25% dimethylamino ethyl methacrylate copolymer in the form of a latex (water-in-oil). (See: Table II, U.S. 3,624,019.) | 30 |

All of the above dispersions were stable and were capable of being stored under a variety of conditions without inter-reaction of the two polymers. The preferred anionic polymer is either sodium polyacrylate (V) or acrylamide-methacrylic acid copolymer (I).

Coating Composition A

To Dispersion A there was added 50% by weight of an aqueous solution containing 42% by weight of sodium aluminate. After standing a short time, approximately 5 to 10 minutes, the emulsion inverts and the polymers are in solution forming a gel-type material.

Coating Composition B

To Dispersion B there was added 100 grams of 42% aqueous solution of sodium aluminate. The polymers go into solution within 10 minutes forming a gel-type structure.

To illustrate other novel dispersions of the invention, Table VI is presented below:

TABLE VI

| Coating Composition | Dispersion from Table V | Percent by wt. | Sodium aluminate | Percent sodium aluminate (by wt.) |
|---|---|---|---|---|
| C | C | 60 | 42% solution | 40 |
| D | P | 50 | do | 50 |
| E | E | 70 | do | 30 |

Inversion of the dispersion

The finished coating composition is stable generally for only a short period of time. Upon dispersion of sodium aluminate in the mixed polymeric latex the emulsion begins to invert thereby releasing the finely-divided water-soluble anionic and cationic vinyl addition polymers into solution. This reaction between the highly alkaline sodium aluminate solution and the polymeric latex produces within a matter of minutes a reaction product which may be described as a three-dimensional, water and hydrocarbon liquid insoluble gel-like structure. These gel-like structures are spongy, porous, and are substantially incapable of adherence to most hydrophobic surfaces. They may be prepared from dilute solutions of the liquid dispersions in the form of films which may be cast on such surfaces as glass, metals, or they may be formed on to other substrates such as a wide variety of fibers such as cloth, paper and the like.

The sodium aluminate containing polymeric latex may be inverted by any number of means. A surfactant may be added to either the polymer-containing emulsion or to the sodium aluminate into which it is to be added. The placement of a surfactant into the sodium aluminate causes the emulsion to rapidly invert and release the polymer in the form of an aqueous solution. When this technique is used to hasten the inversion of the sodium aluminate-polymer-containing emulsion the amount of surfactant may vary over a range of 0.01 to 50% based on polymer. Good inversion often occurs within the range of 1.0 to 10% based on polymer.

The preferred surfactants are hydrophilic and are further characterized as being water-soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of lauryl amine hydrochloride, and stearyl amine hydrobromide.

Any anionic, cationic, or nonionic compound can be used as the surfactant.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water which contains the sodium aluminate.

Other techniques for increasing the inversion of the emulsions include the use of agitation, high voltage electrical fields and heat. For any particular polymer-containing emulsion a suitable method for its inversion may be readily determined by routine experimentation.

The coating Compositions A through E, as prepared above, formed an opaque rubbery-like gel that was insoluble in water and in most common organic solvents, e.g., pentane, methanol, xylene and the like.

When the sodium aluminate was added to the polymeric latex, the dispersion was not stable after a short period of time. The emulsion began to invert and the polymer was released into the solution. The gel was allowed to air dry for three days. At the end of this time the structure became more rubbery and had shrunken considerably in size due to loss of liquid. It was still semiflexible and was difficult to pull apart.

Composition C was roller coated onto a sheet of glass and a piece of cotton cloth. After setting the produced film was washed with pentane to remove the organic solvent. The films produced on both the glass and the cotton cloth rendered the surfaces resistant to oil staining.

It is believed that the gel-like structures are formed when the isoelectric point of the inverted water-soluble vinyl addition polymers and the sodium aluminate is reached. The exact amount of either of the polymers or of sodium aluminate to effectively neutralize one another is difficult to determine. When the ratio of one ingredient exceeds the amount needed to exactly neutralize the other, substantial quantities of excess polymer are believed to be entrapped by the gel-like structure. Thus, by varying excesses of one of the polymers or sodium aluminate it is possible to produce a neutral gel-like structure which has entrained within its interstices excesses of polymeric material that will impart to the gel-like structure either an anionic or cationic charge together with strength and resilience. This effect allows the structures to be coated or adherently bonded to many hydrophilic surfaces by means of ionic or polar attractive forces.

The gel-like structures can be dried and used as ion exchange resins (ion retardation type). They may also be used to produce permeable dialysis films.

In preparing the porous gel-like structures from the liquid dispersions of the invention it is possible to add other chemicals to the dispersion just prior to or at the time of inversion. When such a technique is used it is possible to entrap many chemicals within the gel-like structure which would be released under certain circumstances. For instance, slow release of corrosion inhibitors, bactericides, herbicides, and the like may be prepared.

Having thus described the invention, what is claimed is:

1. A coating composition by weight percent consisting essentially of:
   (A) from 1 to 99% of sodium aluminate; and
   (B) from 1 to 99% of a stable liquid dispersion of:
      (1) a polymeric latex composed of a water-in-oil emulsion which contains dispersed therin a finely divided water-soluble anionic polymer of an ethylenically unsaturated monomer, said polymeric latex having uniformly distributed therethroughout,
      (2) a water-soluble cationic polymer with the weight ratio of (1):(2) being within the range of 1:10 to 10:1 and the total amount of the anionic polymer of (1) plus (2) present within said dispersion being within the range of from 0.001% to 75%; and
   (C) the oil of said emulsion being selected from the group consisting of benzene, xylene, toluene, mineral oil, kerosene, naphtha and petrolatum.

2. The coating composition of claim 1 where the weight ratio of (1):(2) is within the range of from 1:5 to 5:1 and the amount of the anionic polymer of (1) plus (2) present within said dispersion is within the range of from 5% to 40% by weight.

3. The coating composition of claim 1 where the weight ratio of (1):(2) is within the range of from 1:2 to 2:1 and the amount of (1) plus (2) present within said dispersion is within the range of from 10% to 30% by weight.

4. The coating composition of claim 1 wherein the anionic polymer is selected from the group consisting of acrylamide-sodium acrylate copolymer and acrylamide-methacrylic acid copolymer and wherein the cationic polymer is an alkylene polyamine polymer.

5. A coating composition by weight consisting essentially of:
   (A) from 1 to 99% of sodium aluminate; and
   (B) from 1 to 99% of a stable liquid dispersion of:
      (1) a polymeric latex composed of a water-in-oil emulsion which contains dispersed therein a finely-divided anionic polyacrylic acid or a water-soluble salt thereof, said polymeric latex having uniformly distributed therethroughout,
      (2) a water-soluble cationic akylene polyamine polymer: with the weight ratio of (1):(2) being within the range of 1:10 to 10:1 and the total amount of the anionic polymer of (1) plus (2) present within said dispersion being within the range of from 0.001% to 75%; and
   (C) the oil phase of said emulsion being selected from the group consisting of benzene, xylene, toluene, mineral oil, kerosene, naphtha and petrolatum.

6. A coating composition by weight consisting essentially of:
   (A) from 1 to 99% of sodium aluminate; and
   (B) from 1 to 99% of a stable liquid dispersion of:
      (1) a polymeric latex composed of a water-in-oil emulsion which contains dispersed therein a finely-divided water-soluble anionic polymer of an ethylenicaly unsaturated monomer, said polymeric latex having uniformly distributed therethroughout;
      (2) a water-soluble cationic polymer of an ethylenically unsaturated monomer; with the weight ratio of (1):(2) being within the range of 1:10 to 10:1 and the total amount of the anionic polymer of (1) plus (2) present within said dispersion being within the range of from 0.001% to 75%; and
   (C) the oil phase of said emulsion being selected from the group consisting of benzene, xylene, toluene, mineral oil, kerosene, naphtha and petrolatum.

7. A coating composition according to claim 6 wherein the anionic polymer is selected from the group consisting of acrylamide-sodium acrylate copolymer and acrylamide-methacrylic acid copolymer and wherein the cationic polymer is selected from the group consisting of ethylene dichloride-ammonia condensation polymer or the methyl chloride quaternary thereof, tetraethylene pentamine-epichlorhydrin condensation polymer, and polyethylene diamine.

8. A coating composition by weight consisting essentially of:
   (A) from 10 to 40% of sodium aluminate; and
   (B) from 60 to 90% of:
      (1) a polymeric latex composed of a wateer-in-oil emulsion which contains dispersed therein a finely-divided water-soluble anionic polymer of an ethylenically unsaturated monomer, said polymeric latex having uniformly distributed therethroughout;

(2) a water-soluble cationic polymer; with the weight ratio of (1):(2) being within the range of 1:10 to 10:1 and the total amount of the anionic polymer of (1) plus (2) present within said dispersion being within the range of from 0.001% to 75%; and (C) the oil phase of said emulsion being selected from the group consisting of benzene, xylene, toluene, mineral oil, kerosene, naphtha and petrolatum.

9. The coating composition of claim 8 wherein the anionic polymer is selected from the group consisting of acrylamide-sodium acrylate copolymer and acrylamide-methacrylic acid copolymer and wherein the cationic polymer is selected from the group consisting of ethylene dichloride-ammonia condensation polymer or the methyl chloride quaternary thereof, tetraethylene pentamine-epichlorhydrin condensation polymer and polyethylene diamine.

10. The coating composition of claim 8 wherein the anionic polymer is selected from the group consisting of acrylamide-sodium acrylate copolymer and acrylamide-methacrylic acid copolymer and wherein the cationic polymer is an alkylene polyamine polymer.

References Cited

UNITED STATES PATENTS

| | | | |
|---|---|---|---|
| 2,832,746 | 4/1958 | Jackson | 260—29.6 |
| 3,435,009 | 3/1969 | Sellet | 260—29.6 |
| 3,546,142 | 12/1970 | Michaels et al. | 260—29.6 |
| 3,215,647 | 11/1965 | Dunn | 260—29.6 |
| 3,652,479 | 3/1972 | Mogelnicki et al. | 260—29.6 |
| 3,686,109 | 8/1972 | Aldrich et al. | 260—29.6 |

FOREIGN PATENTS 1,130,873  10/1968  Great Britain.

HAROLD D. ANDERSON, Primary Examiner

U.S. Cl. X.R.

117—126 GB, 128.4; 260—2.5 L, 29.6 WB, 29.6 R, 29.6 HN, 29.6 H, 29.6 MH